(12) United States Patent
Olsen et al.

(10) Patent No.: US 10,024,110 B2
(45) Date of Patent: Jul. 17, 2018

(54) EARTH-BORING DRILL BITS WITH NANOTUBE CARPETS

(71) Applicant: Halliburton Energy Services, Inc., Houston, TX (US)

(72) Inventors: Garrett T. Olsen, The Woodlands, TX (US); Jeffrey G. Thomas, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 351 days.

(21) Appl. No.: 14/410,157

(22) PCT Filed: Dec. 18, 2013

(86) PCT No.: PCT/US2013/076192
§ 371 (c)(1),
(2) Date: Dec. 22, 2014

(87) PCT Pub. No.: WO2015/094236
PCT Pub. Date: Jun. 25, 2015

(65) Prior Publication Data
US 2016/0265283 A1    Sep. 15, 2016

(51) Int. Cl.
| | |
|---|---|
| *E21B 10/46* | (2006.01) |
| *E21B 10/54* | (2006.01) |
| *C04B 35/56* | (2006.01) |
| *C04B 35/628* | (2006.01) |
| *C04B 35/63* | (2006.01) |
| *C04B 35/64* | (2006.01) |
| *C04B 35/80* | (2006.01) |

(Continued)

(52) U.S. Cl.
CPC .......... *E21B 10/54* (2013.01); *C04B 35/5626* (2013.01); *C04B 35/62839* (2013.01); *C04B 35/6303* (2013.01); *C04B 35/64* (2013.01); *C04B 35/806* (2013.01); *E21B 10/42* (2013.01); *C04B 2235/3847* (2013.01); *C04B 2235/422* (2013.01); *E21B 10/08* (2013.01)

(58) Field of Classification Search
CPC ................ B22F 2998/00; B22F 1/0025; B22F 2005/001; B22F 7/06; E21B 10/567; E21B 10/00; E21B 10/46
See application file for complete search history.

(56) References Cited

U.S. PATENT DOCUMENTS

| | | | |
|---|---|---|---|
| 4,793,424 A | 12/1988 | Lim, Jr. | |
| 6,073,518 A * | 6/2000 | Chow | B22D 19/06 419/27 |
| 6,495,258 B1 * | 12/2002 | Chen | B32B 5/26 428/408 |

(Continued)

FOREIGN PATENT DOCUMENTS

| | | |
|---|---|---|
| CN | 202152638 U | 2/2012 |
| WO | 2012012636 A1 | 1/2012 |

OTHER PUBLICATIONS

International Search Report and Written Opinion for PCT/US2013/076192 dated Sep. 24, 2014.

*Primary Examiner* — Kipp C Wallace
(74) *Attorney, Agent, or Firm* — McDermott Will & Emery LLP (57) ABSTRACT

An earth-boring drill bit includes a bit body having a powder component and a binder. The powder component includes a plurality of nanotubes disposed on a surface of at least one particle of the powder component.

17 Claims, 5 Drawing Sheets

(51) Int. Cl.
*E21B 10/42* (2006.01)
*E21B 10/08* (2006.01)

(56) References Cited

U.S. PATENT DOCUMENTS

| | | | | |
|---|---|---|---|---|
| 7,459,013 | B2 | 12/2008 | Holmes et al. | |
| 7,968,184 | B2 | 6/2011 | Humphreys et al. | |
| 2002/0179564 | A1* | 12/2002 | Geobegan | B82Y 30/00 |
| | | | | 216/7 |
| 2008/0210473 | A1 | 9/2008 | Zhang et al. | |
| 2009/0142594 | A1 | 6/2009 | Humphreys et al. | |
| 2009/0283333 | A1* | 11/2009 | Lockwood | C22C 1/051 |
| | | | | 175/393 |
| 2010/0051881 | A1* | 3/2010 | Ahn | B82Y 30/00 |
| | | | | 252/513 |
| 2010/0159240 | A1* | 6/2010 | Shah | B22F 3/002 |
| | | | | 428/368 |
| 2012/0034150 | A1* | 2/2012 | Noyes | B82Y 30/00 |
| | | | | 423/447.2 |
| 2012/0037431 | A1 | 2/2012 | DiGiovanni et al. | |
| 2012/0040188 | A1* | 2/2012 | Davies | B22F 1/025 |
| | | | | 428/404 |
| 2012/0135858 | A1* | 5/2012 | Silvy | B01J 21/10 |
| | | | | 502/177 |
| 2013/0029836 | A1* | 1/2013 | Seals | B01J 23/74 |
| | | | | 502/177 |
| 2013/0196844 | A1* | 8/2013 | Keller | C01B 31/36 |
| | | | | 501/90 |
| 2014/0065447 | A1* | 3/2014 | Liu | H01M 4/131 |
| | | | | 429/7 |
| 2015/0165517 | A1* | 6/2015 | Koyama | B22C 3/00 |
| | | | | 420/528 |

\* cited by examiner

EARTH-BORING DRILL BITS WITH NANOTUBE CARPETS

FIELD OF THE INVENTION

The present disclosure relates generally to the drilling of a well for recovery of subterranean deposits and more specifically to systems and methods for drilling having a matrix bit body with nanotube carpets.

DESCRIPTION OF RELATED ART

Wells are drilled to various depths to access and produce oil, gas, minerals, and other naturally-occurring deposits from subterranean geological formations. Drilling is performed by an earth-boring drill bit that is rotated to create a wellbore by removing topsoil, sand, clay, limestone, calcites, dolomites, or other materials. Different types of drill bits may be employed, some of which may include a rotary cone drill bit or a fixed cutter drill bit. While the rotary cone drill bit includes a drill bit body made up of multiple rotating parts that include moving cutting elements, a fixed cutter drill bit includes a one-piece body having cutting elements affixed to the exterior of a drill bit body. The drill bit body may be formed from any number of fabrication methods, such as casting, machining, or a combination thereof.

In the case of a fixed cutter drill bit, the cutting elements, which are the relatively sharp elements that engage and remove material from the formation to form the wellbore, are typically installed and affixed to the drill bit body after the drill bit body has been formed. In some cases, fixed cutter drill bits are formed of a hard matrix material. These matrix drill bits, while typically more erosion resistant that steel, often lack toughness and strength, thus making them brittle and susceptible to cracking when subjected to the stresses and forces associated with drilling. Cracks in the drill bit body may cause the loss of cutting elements and may result in quicker failure of the drill bit.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention; and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense; and the scope of the illustrative embodiments is defined only by the appended claims.

The embodiments described herein relate to systems, tools, and methods for improving the strength and durability of a matrix drill bit by coating a powder component of the matrix drill bit with nanomaterial. The matrix drill bit may be a fixed cutter drill bit as is described in some examples. In many examples, the powder component of a matrix drill bit is coated with carbon nanotubes. The powder component then is combined with a binder in a mold to form the matrix drill bit. The resultant matrix drill bit has improved wear and strength characteristics. The carbon nanotubes both increase the hardness of the powder component and provide for increased mechanical interactions between the powder component and the binder.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion and, thus, should be interpreted to mean "including, but not limited to." Unless otherwise indicated, as used throughout this document, "or" does not require mutual exclusivity.

Carbon nanotubes have a tube-like structure that may be formed by a single atom-thick layer of carbon. In many embodiments described herein, the carbon nanotubes also may be multi-walled nanotubes where consecutive tubes are nested on top of each other.

Various types and species of nanotubes may be used in coating the powder component as described herein.

Figure 1:
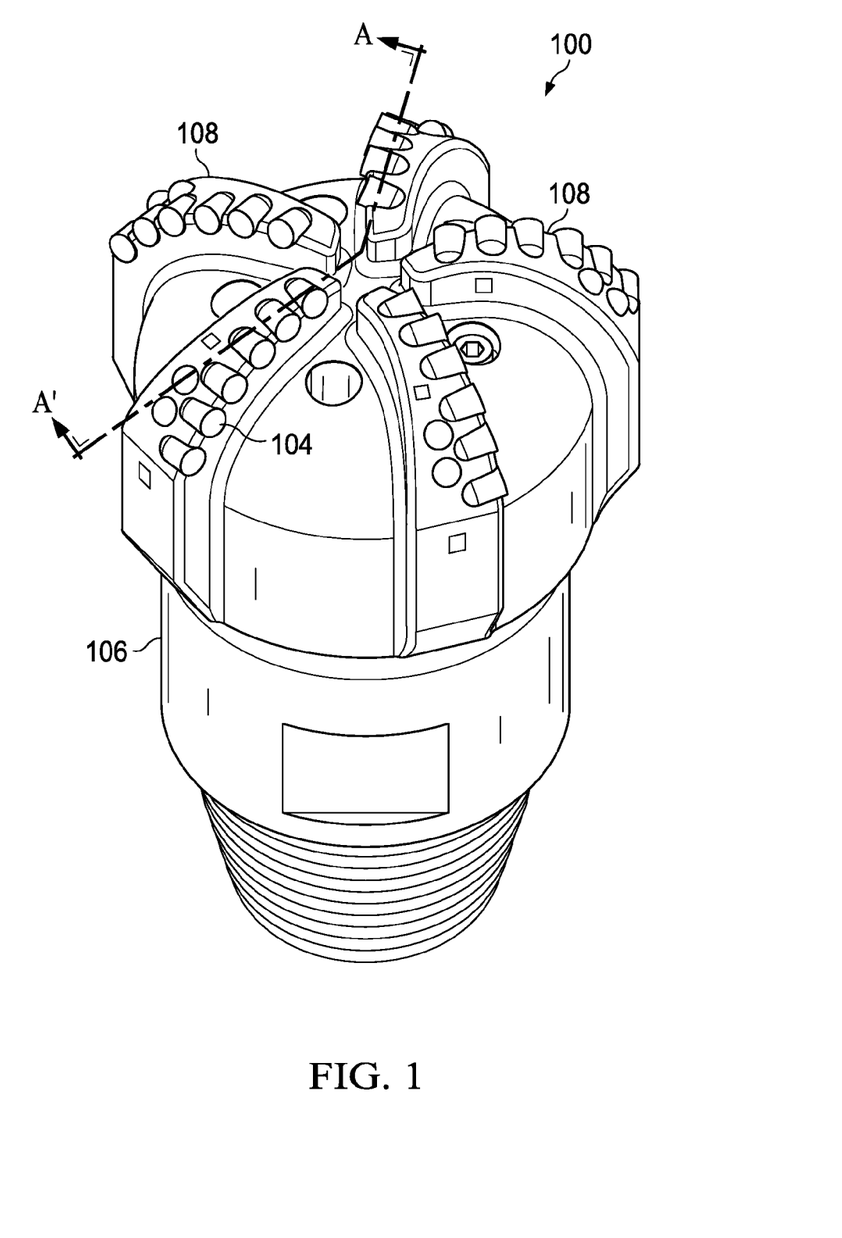
FIG. 1 illustrates a perspective view of an embodiment of a fixed cutter drill bit.

FIG. 1 illustrates a perspective view of an embodiment of a fixed cutter drill bit 100. Drill bit 100 includes a bit body 106 having a plurality of blades 108 proximate a lower end of the bit body 106. Each blade 108 may include a plurality of recesses, each to receive a cutter 104, or cutting element, that may be brazed or otherwise coupled to the blade 108. Each cutter 104 may be a polycrystalline diamond compact (PDC) cutter including a polycrystalline diamond layer to form a cutting face of the cutter 104.

The bit body 106 may be made from a hard matrix material formed from a powder component and a binder. The powder component may include a carpet of carbon nanotubes to provide a framework for increased mechanical interactions between the powder component and the binder in the matrix drill bit. These interactions between the powder component including a carpet of carbon nanotubes and the binder increase the durability of the matrix drill bit and improve properties such as the strength of the resulting matrix and increased erosion resistance. Erosion resistance is the ability of the matrix drill bit to resist being worn away by materials in the drilling fluid and by the material being drilled with which the matrix drill bit interacts. The nanotube carpets are grown on the powder component (or particulate phase) of the matrix drill bit prior to formation. In many cases, the powder component may be a tungsten carbide powder such as P90 or P100 commercially available from Kennametal, but other powder components may be used. Coating catalysts may be used to assist in the attachment of the nanotubes, including nanoparticles of iron, cobalt, nickel, and/or copper. The method of coating may include coating with a solution of nanoparticles, coating with a solution of salt, or tackifying reinforcing agents that add nanoparticles. Carbon-based growth gases then are provided such as methane, acetylene, ethylene, carbon monoxide, methanol, and ethanol, in order to grow the nanotubes at temperatures from 600° C. to 1100° C.

Once the powder component is coated with a carpet of carbon nanotubes, the matrix drill bit 100 may be formed by combining the nanotube carpet coated powder component with a binder. The nanotube carpet coated powder is placed in a mold to form the bit body 106, and molten particles of the binder are infiltrated into the mold to form the bit body 106. In many cases, the binder will be a copper alloy, such as MF53 commercially available from Belmont Metals. As the binder is infiltrated into the nanotube carpet coated powder component during molding, the binder fills the interstitial spaces in the powder component to form a solid drill bit. The mechanical interactions between the powder component and the binder are increased by the presence of the carbon nanotubes.

This process of forming the bit body 106 results in a matrix drill bit including a powder component coated with a carpet of carbon nanotubes that has increased erosion resistance. Since the powder component may be present at or near a surface of the bit body 106, the carpet of carbon nanotubes associated with the powder component may, in some configurations, provide an external layer of exposed carbon nanotubes that increase the hardness of the matrix and the resistance to erosion. Further, the mechanical interaction between the binder and the nanotube coated powder component will be increased, which in turn increases the strength of the matrix. Finally, the interaction between the nanotube coated powder component and binder may not create phase boundary concerns, which could otherwise result from the spatial interface between the binder (a liquid) and the powder component (a solid) exhibiting immiscible properties.

When forming the drill bit body, the ratio of tungsten carbide to binder (copper) may influence the toughness and hardness of the bit produced. Generally, more binder yields a tougher bit which is less likely to fracture. More tungsten carbide yields a harder bit that is more likely to fracture. Grain size of the tungsten carbide also matters, as generally larger grains increase erosion resistance and smaller grains increase overall matrix strength. The addition of a carbon nanotube carpet to small grain tungsten carbide may increase the toughness of the bit without sacrificing the hardness of the bit, since the tungsten carbide (or other powder component) with the carbon nanotube carpets holds the binder and other particles more securely.

Figure 2:
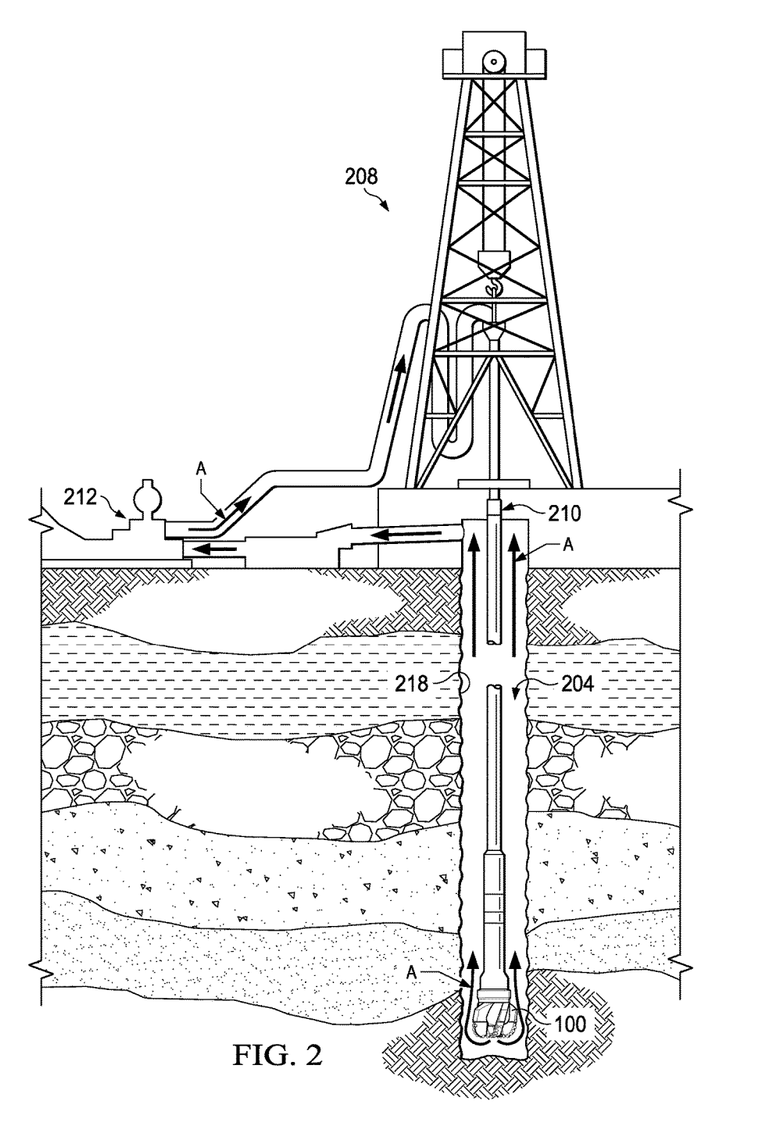
FIG. 2 illustrates an elevation view of an embodiment of a drill bit such as the fixed cutter drill bit of FIG. 1 engaged in drilling operations.

FIG. 2 illustrates an elevation view of an embodiment of a drilling system 200 deployed in a well 204. A drill rig 208 is positioned at a surface of the well 204 to lower and rotate a drill string 210 as the matrix drill bit 100 is advanced into the well 204 thereby creating a wellbore 218. A pump 212 circulates drilling fluid or "mud" (as illustrated by flow arrows A) to the bottom of the wellbore through the drill string 210. The drilling fluid returns to the surface of the well 204 through an annulus between the drill string 210 and the wellbore 218.

As previously described, the drill bit 100 includes bit body, which may be made from a hard matrix material formed from a nanotube-coated or containing powder component and a binder. As the drill bit 100 rotates, the applied weight-on bit ("WOB") forces the downward pointing cutters of the rotating bit into the formation being drilled. The points of the cutters apply a compressible stress which exceeds the yield stress of the formation, and this induces fracturing in the formation. A cutting face of the drill bit is the area where the drill bit interfaces with the material or formation being drilled. The cutting face typically includes the portions of the cutters and sometimes other raised areas on a fixed cutter drill bit. Fragments resulting from cutting (also referred to as "cuttings") are flushed away from the cutting face the flow of the drilling fluid. This flow of fluids and cuttings past the drill bit contributes to erosion and wear of the drill bit and may also further stress the cutters, the bit body and any coupling between the cutters and the bit body. The presence of a plurality of nanotubes or nanotube carpets on the powder component of the hard matrix is believed to reduce damage and erosion to the drill bit 214.

Figure 3:
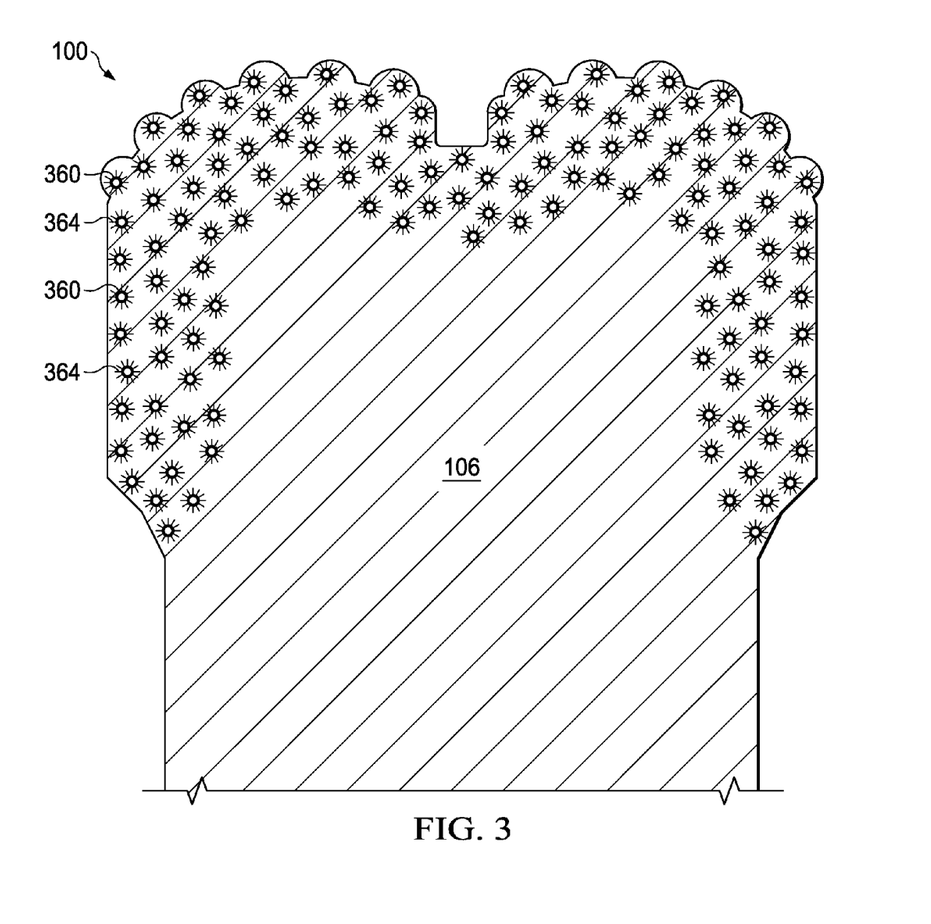
FIG. 3 illustrates a cross-section the fixed cutter drill bit of FIG. 1 taken at A-A', the drill bit comprised of a matrix material having nanotube carpets.

FIG. 3 illustrates a cross-section of the fixed cutter drill bit 100 of FIG. 1 taken at A-A'. In FIG. 3, the powder component of the hard matrix material is schematically represented by powder particles 360, and each powder particle 360 includes a plurality of nanotubes 364 or a nanotube carpet coupled to the powder particle 360. In the embodiment illustrated in FIG. 3, the nanotubes 364 may increase the erosion resistance of the drill bit 100, especially when portions of the nanotubes 364 are exposed at the cutting surface of the drill bit 100 or on a surface of the bit body 106.

Figure 4:
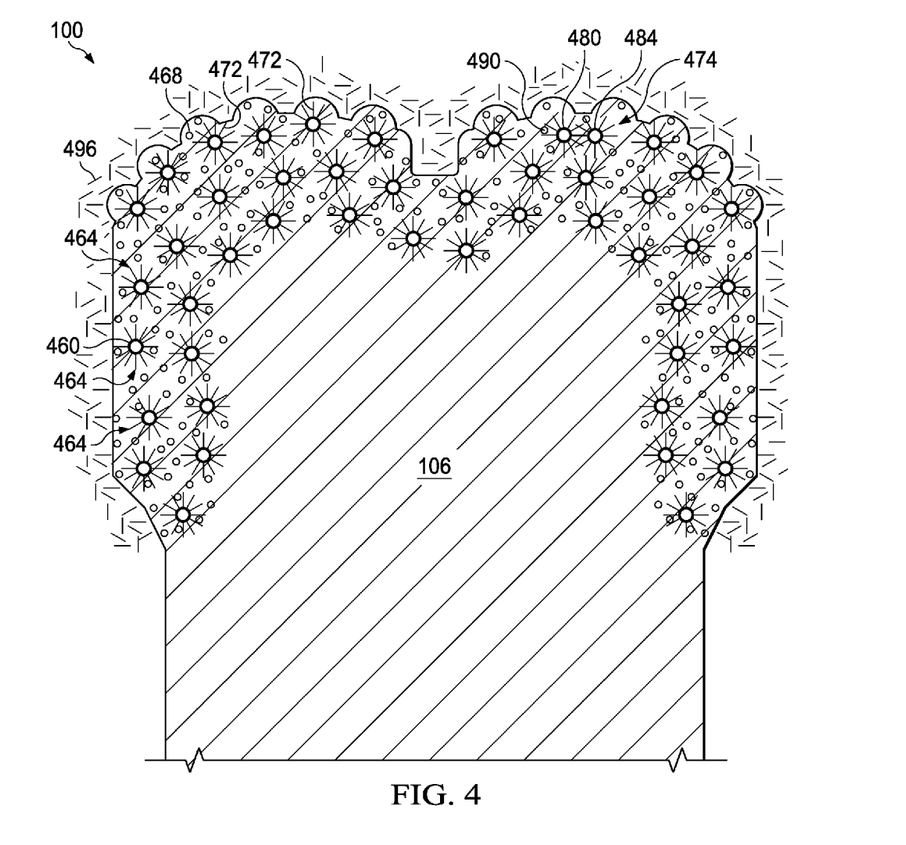
FIG. 4 illustrates a cross-section of the fixed cutter drill bit of FIG. 1 taken at A-A', showing an example of mechanical interactions that may occur between powder particles coated with nanotube carpets.

FIG. 4 illustrates a cross-section of the fixed cutter drill bit 100 of FIG. 1. In FIG. 4, the powder component of the hard matrix material is schematically represented by powder particles 460, and each powder particle 460 includes a plurality of nanotubes 464 or a nanotube carpet coupled to the powder particle 460. The binder component of the hard matrix material is schematically represented by binder particles 468. FIG. 4 schematically represents the mechanical interactions that may occur between nanotube coated or containing powder particles 460 and binder particles 468. Referring more specifically to nanotubes 472 of a nanotube carpet 474 on closely situated powder particles 480, 484 may intersect and provide mechanical resistance against each other. Furthermore, binder particle 490 may be situated between nanotubes 472 and may provide resistance to erosion or fracture to the fixed cutter drill bit 100. The proximity and mechanical interactions between binder particle 490 and nanotubes 472 may allow the nanotube carpet 474 to bend in response to forces on the binder particle 490 or the powder particle 480, which may prevent the powder particle 480 from releasing from the binder particle 490. Additionally, when the nanotube-coated or containing powder component is exposed during drilling operations, nanotubes 496 may be detached from exposed powder component and may provide additional lubrication at the area where drilling is occurring. As previously described, the exposed carbon nanotubes may assist in the resistance of the drill bit to erosion due to the strength and stiffness of the carbon nanotubes.

Figure 5:
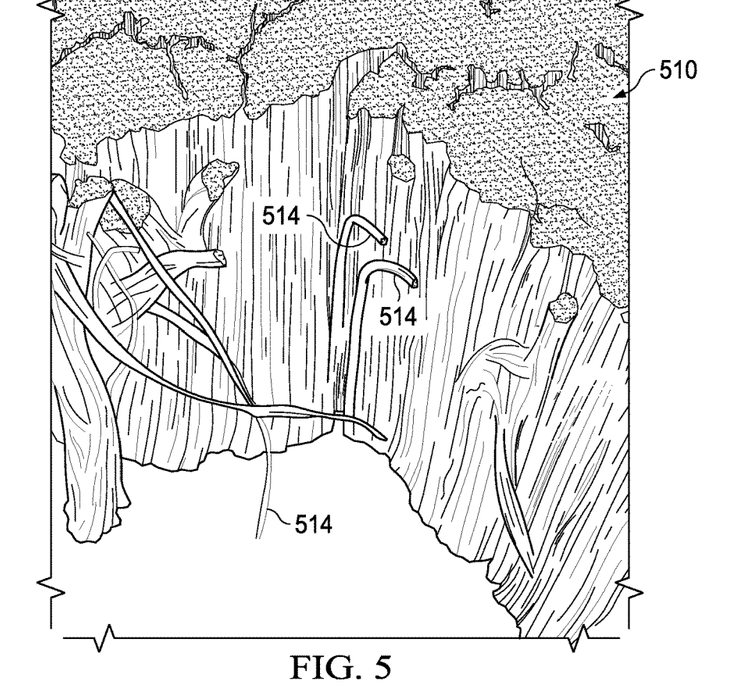
FIG. 5 illustrates a schematic representation of an image of a nanotube carpet taken by an electron microscope.

FIG. 5 illustrates a schematic representation of an image of a nanotube carpet 510 taken by an electron microscope. The nanotube carpet 510 includes a plurality of nanotubes 514 that may be oriented in a substantially parallel orientation to one another, although variations in the orientation of individual nanotubes or groups of nanotubes may be observed. Nanotube carpets may include arrangements of nanotubes that are regular and substantially evenly spaced. In addition, the nanotubes making up a nanotube carpet may also be of substantially the same length in some embodiments. The nanotube carpet 510 may be grown, coated or otherwise coupled to the powder component of hard matrix drill bits as described herein. While the materials and drill bits described herein may incorporate carpets of nanotubes in some embodiments, in other embodiments, in other embodiments a plurality of nanotubes may be included without necessarily being arranged in a carpet configuration.

Figure 6:
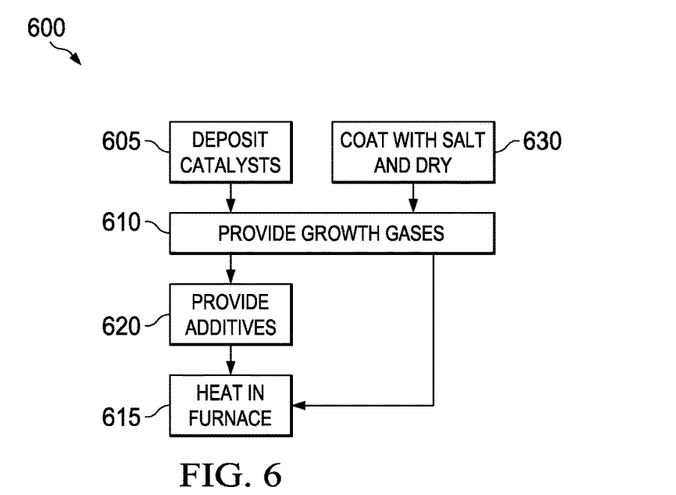
FIG. 6 illustrates a flow chart describing an example of how nanotube reinforcing agents may be formed on the powder component of the matrix drill bit.

FIG. 6 is a flow chart describing an illustrative embodiment of a process 600 for forming a hard matrix drill bit and more specifically a process for forming nanotube reinforcing agents on a powder component of the matrix. In step 605, catalysts such as iron, cobalt, nickel, and/or copper nanoparticles are coated on the surface of the powder component for the matrix drill bit. In many configurations, the powder component may be tungsten carbide; however, other powder components/reinforcing agents may be used. Growth gases containing carbon like methane, acetylene, ethylene, carbon monoxide, methanol, and ethanol then are provided to the powder component in step 610. In step 615, the gases and powder component are heated in a furnace or fluidized bed. In step 620, additives may be included to assist in the growth and deposition of nanotube carpets. Additive materials such as water, hydrogen, and surface-containing gases may be used in some configurations. Optionally, in step 630, instead of priming deposition areas with nanoparticles, a solution of salt may be used to coat the powder component that, when dried, forms appropriately sized metal clusters. A furnace or fluidized bed may be used at temperatures of approximately 600° C. up to 1100° C. to form the nanotube carpets.

After forming nanotube carpets on the powder component of the matrix drill bit, the matrix drill bit may be formed. Carbon nanotube carpets on the power component (or other reinforcing agent) may wick the binder (during infiltration when the binder is in liquid form), typically copper, into the interstitial spaces of the carbon nanotube carpet. This may form a stronger matrix drill bit due to the strength of the carbon nanotubes and the spaces of the material being more completely filled. One issue with formation is that the nanotubes are carbon so, at elevated temperatures, oxygen content during infiltration may need to be monitored to minimize oxidation of the nanotubes. To address this issue, the mold may be immersed in an inert gas such as helium or nitrogen during sintering.

In an alternative embodiment, the powder component may be placed in a mold prior to growing the carbon nanotube carpets. Nanotubes may then be grown on the powder component while in the mold before infiltration. This may allow for entanglement of the nanotube carpets of adjacent powder component particles. Carbon nanotube carpets may provide a layer that erosion-causing materials contact during drilling. These erosion-causing materials may "bounce" off the carbon nanotube carpet, thereby assisting in erosion resistance. Because carbon nanotube carpets may be infiltrated with the binder, the powder component (or reinforcing agents) with carbon nanotube carpets thereon may not have the phase boundary concerns that other composite powder components (or reinforcing agents) may have. In some configurations, carbon nanotube carpets may be multi-wall nanotubes, for example, up to 30 to 40 walls, so that if, during infiltration oxidation occurs, sacrificial outer layers of the carbon nanotube may be consumed or oxidized while still having the inner tubes for reinforcing.

The durability and hardness of a drill bit, such as a fixed cutter drill bit, is an important factor in being able to continuously perform drilling operations. Less durable and hard drill bits may need to be replaced frequently. Increased durability and hardness of the drill bit may allow for more efficient drilling operations. This disclosure describes systems, tools, and methods for providing a matrix drill bit formed using a carbon nanotube coated powder component. In addition to the embodiments described above, many examples of specific combinations are within the scope of the disclosure, some of which are detailed below.

Example 1. An earth-boring drill bit comprising:
    a bit body having a powder component and a binder, the powder component including a plurality of nanotubes disposed on a surface of at least one particle of the powder component.

Example 2. The earth-boring drill bit of example 1, wherein the plurality of nanotubes is grown on the surface of the powder component.

Example 3. The earth-boring drill bit of any of examples 1 or 2, wherein the powder component comprises tungsten carbide.

Example 4. The earth-boring drill bit of any of examples 1-3, wherein as the matrix bit body is worn away, a new portion of carbon nanotubes on the powder component of the matrix bit body is exposed.

Example 5. The earth-boring drill bit of any of examples 1-4, wherein the plurality of nanotubes is multi-walled nanotubes.

Example 6. The earth-boring drill bit of any of examples 1-5 wherein the plurality of nanotubes creates mechanical interactions between the plurality of nanotubes and the binder.

Example 7. A method of making an earth-boring drill bit, the method comprising:
    forming nanotube carpets on a powder component; and
    infiltrating the powder component with a binder in a mold to form a drill bit.

Example 8. The method of example 7, wherein the forming nanotube carpets includes:
    depositing nanoparticles on the powder component;
    treating the powder component with growth gases; and
    heating the powder component in the presence of the growth gases.

Example 9. The method of any of examples 7 or 8, wherein the depositing of nanoparticles includes providing a salt solution on the powder component and evaporating the salt solution.

Example 10. The method of any of examples 7-9, wherein the nanoparticles are selected from a group consisting of iron nanoparticles, cobalt nanoparticles, nickel nanoparticles, and copper nanoparticles.

Example 11. The method of any of examples 7-10, wherein the nanoparticles are placed in a mold for the drill bit prior to the forming of nanotube carpets.

Example 12. The method of any of examples 7-11, wherein the powder component is tungsten carbide.

Example 13. The method of any of examples 7-12, wherein the infiltrating includes wicking the binder component with the nanotube carpets to fill interstitial spaces.

Example 14. The method of example 8, wherein the growth gases are selected from a group consisting of methane, acetylene, ethylene, carbon monoxide, methanol, and ethanol.

Example 15. The method of any of examples 7-14, wherein the nanotube carpets include multi-walled carbon nanotubes.

Example 16. The method of any of examples 7-15, wherein during infiltration, the oxygen concentration in the mold is controlled to prevent the degradation of the nanotube carpets.

Example 17. The method of example 16 wherein the controlling of the oxygen concentration is performed by immersing the mold in an inert gas.

Example 18. A fixed cutter drill bit comprising:
a bit body; and
a plurality of cutters disposed on the bit body;
wherein the bit body includes a carpet of nanotubes disposed on a surface of a powder component forming the bit body.

Example 19. The fixed cutter drill bit of example 18, wherein the matrix drill bit body and the plurality of cutters further include a binder.

Example 20. The fixed cutter drill bit of examples 18 or 19, wherein the carpet of nanotubes is grown on the powder component.

Example 21. The fixed cutter drill bit of any of examples 18-20, wherein the erosion resistance of the fixed cutter drill bit is increased as a result of the carpet of nanotubes.

Example 22. The fixed cutter drill bit of any of examples 18-21, wherein the durability of the fixed cutter drill bit is increased as a result of the carpet of nanotubes.

Example 23. A reinforced drill bit comprising:
a matrix bit body, the matrix bit body including:
a powder component, the powder component including a carpet of nanotubes disposed on a surface of the powder component; and
a binder.

It should be apparent from the foregoing that embodiments of an invention having significant advantages have been provided. While the embodiments are shown in only a few forms, the embodiments are not limited, but are susceptible to various changes and modifications without departing from the spirit thereof.

We claim:

1. An earth-boring drill bit comprising:
a bit body having a powder component and a binder, the powder component including a plurality of nanotubes disposed on a surface of at least one particle of the powder component,
wherein, when the powder component is in a mold, the plurality of nanotubes is grown on the surface of the powder component to form a carpet of nanotubes, and
wherein nanotube carpets formed on adjacent particles of the powder component are entangled.

2. The earth-boring drill bit of claim 1, wherein the powder component comprises tungsten carbide.

3. The earth-boring drill bit of claim 1, wherein as the bit body is worn away, previously unexposed carbon nanotubes associated with the powder component are exposed.

4. The earth-boring drill bit of claim 1, wherein the plurality of nanotubes includes multi-walled nanotubes.

5. The earth-boring drill bit of claim 1, wherein the plurality of nanotubes creates mechanical interactions between the carpet of nanotubes and the binder.

6. A method of making an earth-boring drill bit, the method comprising:
growing nanotube carpets on a powder component when the powder component is in a mold; and
infiltrating the powder component with a binder in the mold to form a drill bit,
wherein nanotube carpets formed on adjacent particles of the powder component are entangled.

7. The method of claim 6, wherein the growing nanotube carpets includes:
depositing nanoparticles on the powder component;
treating the powder component with growth gases; and
heating the powder component in the presence of the growth gases.

8. The method of claim 7, wherein the depositing of nanoparticles further comprises:
providing a salt solution on the powder component; and
evaporating the salt solution.

9. The method of claim 7, wherein the nanoparticles are selected from a group consisting of iron nanoparticles, cobalt nanoparticles, nickel nanoparticles, and copper nanoparticles.

10. The method of claim 7, wherein the nanoparticles are placed in a mold for the drill bit prior to the forming of nanotube carpets.

11. The method of claim 6, wherein the powder component is tungsten carbide.

12. The method of claim 6, wherein the infiltrating includes wicking the binder component with the nanotube carpets to fill interstitial spaces.

13. The method of claim 7, wherein the growth gases are selected from a group consisting of methane, acetylene, ethylene, carbon monoxide, methanol, and ethanol.

14. The method of claim 6, wherein the nanotube carpets include multi-walled carbon nanotubes.

15. The method of claim 6, wherein during infiltration, the oxygen concentration in the mold is controlled to prevent the degradation of the nanotube carpets.

16. The method of claim 15, wherein the controlling of the oxygen concentration is performed by immersing the mold in an inert gas.

17. A fixed cutter drill bit comprising:
a bit body; and
a plurality of cutters disposed on the bit body;
wherein the bit body includes a carpet of nanotubes grown on a surface of a powder component forming the bit body when the powder component is disposed in a mold,
wherein at least one of the bit body and the plurality of cutters further includes a binder, and
wherein nanotube carpets formed on adjacent particles of the powder component are entangled.

* * * * *